US007289428B2

(12) United States Patent
Chow et al.

(10) Patent No.: US 7,289,428 B2
(45) Date of Patent: Oct. 30, 2007

(54) INTER-WORKING MESH TELECOMMUNICATIONS NETWORKS

(75) Inventors: Timothy Y. Chow, Quincy, MA (US); Philip J. Lin, Newton, MA (US); James D. Mills, Wilmington, MA (US)

(73) Assignee: Tellabs Operations, Inc., Naperville, IL (US)

( * ) Notice: Subject to any disclaimer, the term of this patent is extended or adjusted under 35 U.S.C. 154(b) by 1079 days.

(21) Appl. No.: 09/929,210

(22) Filed: Aug. 13, 2001

(65) Prior Publication Data

US 2003/0031124 A1    Feb. 13, 2003

(51) Int. Cl.
*G01R 31/08* (2006.01)
(52) U.S. Cl. ........................ 370/216; 370/406
(58) Field of Classification Search ................ 370/216, 370/217, 218, 219, 220, 221, 222, 223, 224, 370/225, 226, 227, 228, 242, 244, 248, 250, 370/252, 400, 404, 405, 406, 394, 360
See application file for complete search history.

(56) References Cited

U.S. PATENT DOCUMENTS

| | | | |
|---|---|---|---|
| 3,763,320 A | 10/1973 | Chambers, Jr. ........... 179/16 F |
| 5,179,548 A | 1/1993 | Sandesera | |
| 5,218,604 A | 6/1993 | Sosnosky | |
| 5,327,427 A | 7/1994 | Sandesera | |
| 5,390,164 A | 2/1995 | Kremer | |
| 5,394,389 A | 2/1995 | Kremer | |
| 5,406,549 A | 4/1995 | Kremer | |
| 5,440,540 A | 8/1995 | Kremer | |
| 5,544,151 A | 8/1996 | Baek et al. | |
| 5,838,924 A * | 11/1998 | Anderson et al. ........... 709/239 |
| 5,896,474 A | 4/1999 | Van Deventer et al. | |
| 5,901,328 A | 5/1999 | Ooe ............ 395/825 |
| 6,011,780 A | 1/2000 | Vaman et al. .............. 370/237 |
| 6,370,110 B1 * | 4/2002 | Eslambolchi .............. 370/216 |
| 6,556,541 B1 * | 4/2003 | Bare ......................... 370/235 |
| 6,628,649 B1 * | 9/2003 | Raj et al. .................. 370/360 |
| 6,658,457 B2 * | 12/2003 | Nishikawa et al. ........ 709/206 |
| 6,829,216 B1 * | 12/2004 | Nakata ...................... 370/228 |
| 6,831,898 B1 * | 12/2004 | Edsall et al. ............... 370/256 |
| 6,848,006 B1 * | 1/2005 | Hermann ................... 709/239 |
| 6,934,248 B1 * | 8/2005 | DeBoer et al. ............ 370/217 |

(Continued)

OTHER PUBLICATIONS

Synchronous Optical Network (SONET)—Automatic Protection Switching, ANSI® T1.105.01-1998, *Alliance for Telecommunications Industry Solutions*, Approved Apr. 23, 1998, American National Standards Institute, Inc.

(Continued)

*Primary Examiner*—Phirin Sam
(74) *Attorney, Agent, or Firm*—Hamilton, Brook, Smith & Reynolds, P.C.

(57) ABSTRACT

A communication system (5) comprises a first network (10) including a source (11) arranged to transmit data and a second network (30) including a destination (31) arranged to receive the data. Interruptions in communication between the source and destination are reduced by providing a first primary node (12) and a first secondary node (13) in the first network (10), and a second primary node (32) and a second secondary node (33) in the second network (30). First and second sets of primary routes (14 and 34) and secondary routes (18 and 36) are provided within the first and second networks to facilitate delivery of data to various nodes.

49 Claims, 2 Drawing Sheets

U.S. PATENT DOCUMENTS

| | | | |
|---|---|---|---|
| 6,947,374 B2* | 9/2005 | Sasaki et al. | 370/218 |
| 6,990,068 B1* | 1/2006 | Saleh et al. | 370/225 |
| 7,113,699 B1* | 9/2006 | Bhate et al. | 398/15 |
| 2002/0012318 A1* | 1/2002 | Moriya et al. | 370/225 |
| 2002/0167900 A1* | 11/2002 | Mark et al. | 370/225 |
| 2003/0018812 A1* | 1/2003 | Lakshminarayana et al. | 709/241 |
| 2003/0021222 A1* | 1/2003 | Boer et al. | 370/216 |
| 2003/0031123 A1* | 2/2003 | Gilmour et al. | 370/216 |

OTHER PUBLICATIONS

ITU-T G.841, entitled "Types and Characteristics of SDH Network Protection Architectures," dated Oct. 1998.

ITU-T G.842, entitled "Interworking of SDH network protection architectures," dated Apr. 1997.

GR-1400-CORE, entitled "SONET Dual-Fed Unidirectional Path Switched Ring (UPSR) Equipment Generic Criteria," Issue 2, dated Jan. 1999.

GR-1230-CORE, entitled "SONET Bidirectional Line-Switched Ring Equipment Generic Criteria," Issue 4, dated Dec. 1998.

"Self-Healing Rings in a Synchronous Environment," dated Nov. 1991, by Izaz Haque, Wilhelm Kremer and Kamal Raychaudhuri.

"SONET Ring Applications for Survivable Fiber Loop Networks," dated Jun. 1991, by Joseph Sosnosky and Tsong-Ho Wu.

* cited by examiner

INTER-WORKING MESH TELECOMMUNICATIONS NETWORKS

BACKGROUND OF THE INVENTION

This invention relates to inter-network communications, and more particularly relates to fault-tolerant communications between networks.

The SONET standard provides for inter-working between ring networks. The SONET ring inter-working has two versions: (1) drop and continue and (2) dual transmit. SONET ring inter-working was not designed with mesh networks in mind, and therefore cannot be employed "as-is" to mesh networks. SONET ring inter-working must be substantially modified in order to provide resilience to mesh-to-mesh or mesh-to-ring or ring-to-mesh communications.

Ring-based networks in general do not consist of just one ring, but contain multiple rings. Mesh networks, on the other hand, typically are addressed as one large mesh, even though the mesh in fact comprises multiple meshes. If the mesh is perceived as one large mesh, then there is no need for mesh inter-working. Contrary to this conventional wisdom about mesh networks, the applicants have discovered that mesh inter-working is an important aspect of mesh networks. Mesh inter-working is needed for at least three reasons:

(1) Networks owned by different companies need to communicate with each other, while remaining separate entities, to avoid visibility into each other's internal workings and to avoid faults in one network from affecting another network.

(2) Sub-networks resulting from the break up of one large network to facilitate management also need to communicate with each other.

(3) As network managers migrate from ring networks to mesh networks, there will be a need to inter-work the resulting mesh networks.

None of the foregoing problems is subject to an obvious solution. The present invention addresses these problems and provides a solution.

BRIEF SUMMARY OF THE INVENTION

A preferred apparatus embodiment is useful in a communication system comprising a first network including a source arranged to transmit data and a second network including a destination arranged to receive the data. At least one of the first network and the second network is a mesh network. In such an environment, interruptions in communication between the source and destination can be reduced by providing a first primary node and a first secondary node in the first network. A second primary node and a second secondary node are provided in the second network. A first set of primary routes are provided within the first network and are arranged to facilitate delivery of a first set of the data to the first primary node and a second set of the data to the first secondary node. Inter-network routes between the first and second networks are arranged to deliver the first and second sets of the data to the second primary node and the second secondary node. A second set of primary routes within the second network are arranged to facilitate delivery of at least one of the first and second sets of data to the destination node. A selector within the second network is arranged to select one of the first and second sets of data. A first secondary route is located within the first network between the source and the first secondary node. A first route selector is arranged to select the first secondary route in the event that a primary route within the first set of primary routes is disabled. A second secondary route within the second network is located between the second secondary node and the destination. A second route selector is arranged to select the second secondary route in the event that a primary route within the second set of primary routes is disabled.

A preferred method embodiment of the invention is useful in a communication system comprising a first network including a source arranged to transmit data and a second network including a destination arranged to receive the data. At least one of the first network and the second network is a mesh network. The system also comprises a first primary node in the first network, a first secondary node in the first network, a second primary node in the second network, a second secondary node in the second network, a first set of primary routes within the first network, a second set of primary routes within the second network, a first secondary route within the first network between the source and the first secondary node, and a second secondary route within the second network between the second secondary node and the destination. In such a system, interruptions in communication between the source and destination can be reduced by generating a first set of the data and a second set of the data. The first set of the data is delivered to the first primary node, and the second set of the data is delivered to the first secondary node. The first and second sets of the data are delivered to the second primary node and the second secondary node. At least one of the first and second sets of data are delivered to the destination node. One of the first and second sets of data is selected, and the first set of data is delivered to the first secondary node over the first secondary route in the event that a primary route within the first set of primary routes is disabled. At least one of the first and second sets of data is delivered to the destination over the second secondary route in the second network in the event that a primary route within the second set of primary routes is disabled.

By using the foregoing techniques, communications may be transmitted between networks involving at least one mesh network with a degree of accuracy and reliability previously unattainable.

DETAILED DESCRIPTION OF THE INVENTION

Figure 1:
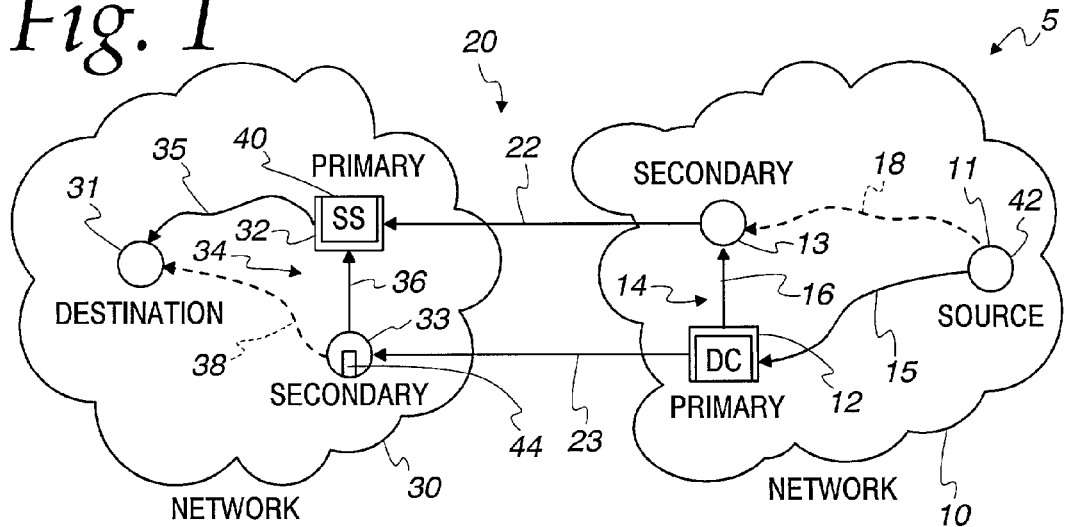
FIG. 1 is a schematic block diagram illustrating one form of a drop and continue embodiment of the invention.

Referring to FIG. 1, one embodiment of the invention comprises a communication system 5 that includes two telecommunications networks 10 and 30, each comprising a collection of geographically dispersed network elements called nodes. Inter-network routes 20, including routes 22 and 23, connect networks 10 and 30.

Network 10 includes a source node 11, a primary node 12 and a secondary node 13, which are connected to one another by communication links or routes (e.g., fiber, wireless links or routes). For example, a set of primary routes 14, including primary routes 15 and 16, links source node 11, primary node 12 and secondary node 13 as shown. A secondary route 18 may link source node 11 with secondary node 13. In all embodiments, a primary route is disjoint from its corresponding secondary route. Otherwise, if the primary and secondary routes intersect, a failure at the intersection point(s) would be a single failure that would disable both routes, defeating one purpose of the embodiments.

Network 30 includes a destination node 31, a primary node 32 and a secondary node 33, which are connected to one another by communication links or routes (e.g., fiber, wireless links or routes). For example, a set of primary routes 34, including primary routes 35 and 36, links destination node 31, primary node 32 and secondary node 33 as shown.

The topology of each network may be a ring or an arbitrary mesh. Traffic may be intra-network, i.e., staying entirely within network 10 or entirely within network 30, or it may be inter-network, i.e., originating in network 10 and terminating in network 30 (or vice versa). For inter-network traffic that needs to be transmitted with high reliability, it is important that the transition between networks 10 and 30 be effected in a way that has no single point of failure. In the case where networks 10 and 30 are both SONET rings, standard ring inter-working methods have been developed (see the ANSI standard T1.105.01-1998, SONET Automatic Protection Switching). The embodiment of FIG. 1 covers the case in which networks 10 and 30 are arbitrary mesh networks and the case in which one is a ring and the other is a mesh.

In the example of FIG. 1, it is assumed that source node 11 is the source of the inter-network data and that destination node 31 in network 30 is the destination for the data.

In each network, two nodes are selected to be dual-homing nodes. One dual-homing node is designated to be the primary node (i.e., nodes 12 and 32) and the other is designated to be the secondary node (i.e., nodes 13 and 33). In each node, a network element, such as a cross-connect, is configured to perform various functions that will be described.

Still referring to FIG. 1, under normal operation, source node 11 sends a first set of data to primary node 12 in network 10. Primary node 12 performs a drop-and-continue function in a well known manner: node 12 creates a copy of the data from source node 11 (i.e., a second set of the data) and "drops" (i.e., transmits) the first set of the data over to one of the dual-homing nodes in network 30, and primary node 12 "continues" (i.e., transmits) the second set of the data onto secondary node 13. (If primary node 12 drops to the primary node in network 30, this is called same-side routing; if primary node 12 drops to the secondary node in network 30, this is called opposite-side routing.) FIG. 1 illustrates opposite-side routing. There may exist intermediate nodes between source node 11 and primary node 12, and between primary node 12 and secondary node 13 (not shown). Secondary node 13 then drops the second set of the data to the other dual-homing node in network 30. The net effect is for network 10 to send two sets (1+1) of the inter-network data to network 30, one to each dual-homing node in network 30 (i.e., to nodes 32 and 33 as shown in FIG. 1).

During normal operation, secondary node 33 in network 30 sends one set of the data to primary node 32 in network 30. Primary node 32 then performs a service selection (SS) function 40: node 32 chooses one of the two incoming sets of data (i.e., the data from secondary node 33 in network 30 or the set of data coming directly from secondary node 13). Primary node 32 then forwards the chosen data set to destination node 31.

The FIG. 1 embodiment is designed to survive any single node or link failure, except for a failure of the source or the destination, which cannot be survived in any case. More specifically, if there is any failure between source 11 and primary node 12 in network 10, secondary node 13 uses a detector function to detect the failure and notify source node 11, which uses a selector function 42 to switch its data traffic to an alternate (protection) path 18 to secondary node 13. If secondary node 13 in network 10 fails, source node 11 and primary node 12 in network 10 continue to operate normally. If one of the links or routes between the two networks fails, the nodes in network 10 continue to act normally; however, if primary node 32 in network 30 was selecting the data set coming directly from network 10 and this data is lost, primary node 32 switches over to selecting the data set from secondary node 33. Similarly, if secondary node 33 in network 30 loses its data set from network 10, node 33 stops sending data traffic to primary node 32. If secondary node 33 in network 30 fails, or if any node or link between the primary and secondary nodes in network 30 fails, then all the remaining nodes will continue to act as they would under normal operation, except that if primary node 32 in network 30 was selecting the data set coming from secondary node 33 in network 30, node 32 will switch over to the data set that received directly from network 10. If there is a failure between primary node 32 in network 30 and destination node 31, then destination node 31 detects the failure and notifies secondary node 33 in network 30, which will uses a selector function 44 to switch data traffic to a protection path 38 to destination node 31. As may be seen from FIG. 1, in all these cases, the data traffic continues to be transmitted from source node 11 to destination node 31.

Figure 2:
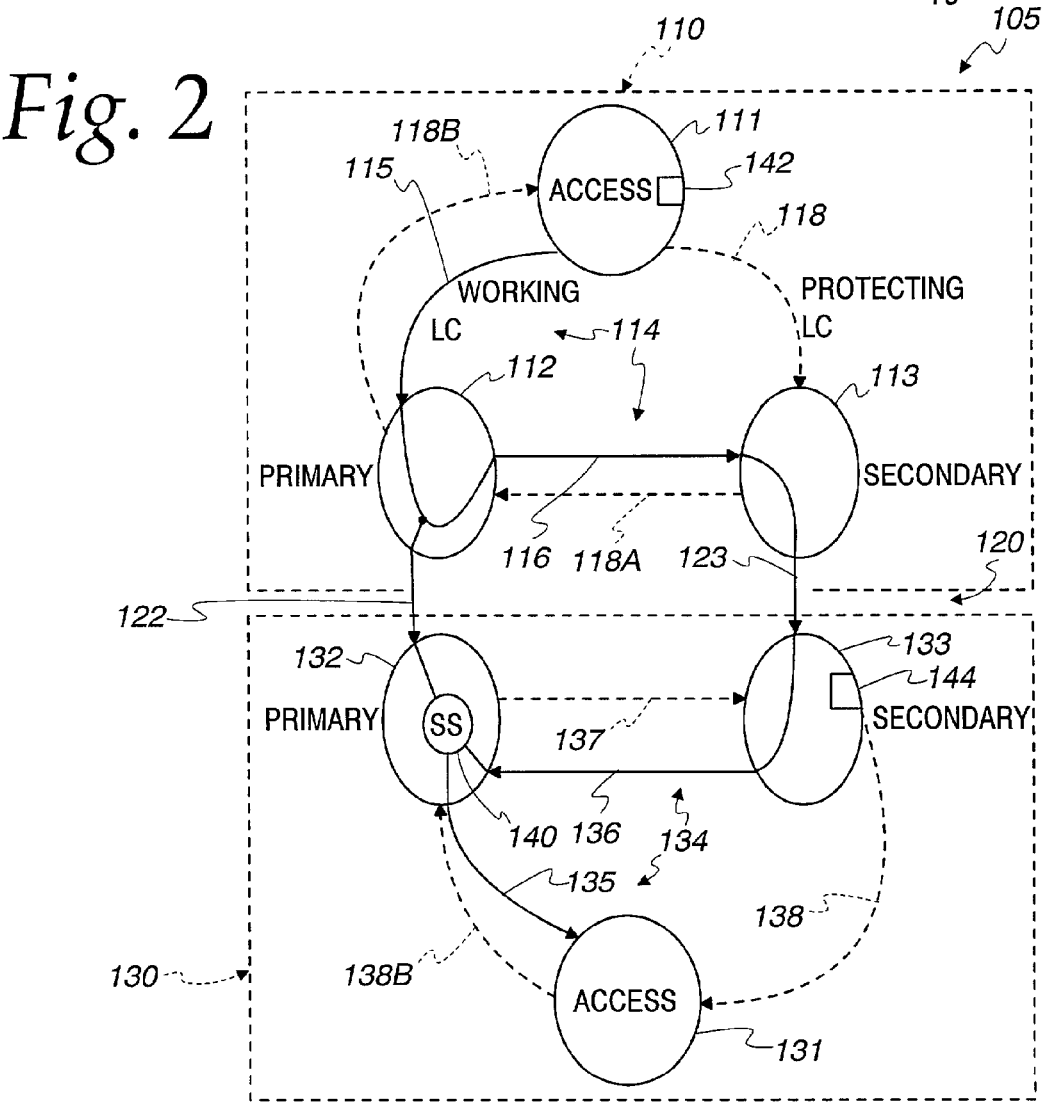
FIG. 2 is a schematic block diagram illustrating another form of a drop and continue embodiment of the invention.

Referring to FIG. 2, another form of the invention using a drop and continue mode of operation is embodied in a communication system 105 including two telecommunications networks 110 and 130, each comprising a collection of geographically dispersed network elements, called nodes. Inter-network routes 120, including routes 122 and 123, connect networks 110 and 130.

Network 110 includes a source node 111, a primary node 112 and a secondary node 113, which are connected to one another by communication links or routes (e.g., fiber, wireless links or routes). For example, a set of primary routes 114, including primary routes 115-116, links source node 111, primary node 112 and secondary node 113 as shown. A secondary route 118 links source node 111 with secondary node 113, and a secondary route 118A links primary node 112 with secondary node 113.

Network 130 includes a destination node 131, a primary node 132 and a secondary node 133, which are connected to one another by communication links or routes (e.g., fiber, wireless links or routes). For example, a set of primary routes 134, including primary routes 135-136, links destination node 131, primary node 132 and secondary node 133 as shown. Secondary routes 137-138 also are provided.

The topology of each network 110 and 130 may be a ring or an arbitrary mesh. Traffic may be intra-network, i.e., staying entirely within network 110 or entirely within network 130, or it may be inter-network, i.e., originating in network 110 and terminating in network 130 (or vice versa). The embodiment of FIG. 2 covers the case in which networks 110 and 130 are arbitrary mesh networks and the case in which one is a ring and the other is a mesh.

In the example of FIG. 2, it is assumed that source node 111 is the source of the inter-network data and that destination node 131 in network 130 is the destination for the data.

In each network, two nodes are selected to be dual-homing nodes. One dual-homing node is designated to be the primary node (i.e., nodes 112 and 132) and the other is designated to be the secondary node (i.e., nodes 113 and 133). In each node, a network element, such as a cross-connect, is configured to perform various functions that will be described.

Still referring to FIG. 2, under normal operation, source node 111 sends a first set of data to primary node 112 over route 115 in network 110. Primary node 112 performs a drop-and-continue function in a well known manner: node 112 creates a copy of the data from source node 111 (i.e., a second set of the data) and "drops" (i.e., transmits) the first set of the data over to primary node 132, and primary node 112 "continues" (i.e., transmits) the second set of the data onto secondary node 113 via route 116. FIG. 2 illustrates a case of same-side routing. (There may exist intermediate nodes between source node 111 and primary node 112, and between primary node 112 and secondary node 113 (not shown).) Secondary node 113 then drops a set of the data to the other dual-homing node in network 130 (i.e., secondary node 133). The net effect is for network 110 to send two sets (1+1) of the inter-network data to network 130, one to each dual-homing node in network 130 (i.e., to nodes 132 and 133 as shown in FIG. 2).

During normal operation, secondary node 133 in network 130 sends the second set of the data to primary node 132 in network 130 via route 136. Primary node 132 then performs a service selection (SS) function 140: node 132 chooses one of the two incoming sets of data (i.e., the data from secondary node 133 in network 130 or the set of data from primary node 112). Primary node 132 then forwards the chosen data set to destination node 131.

The FIG. 2 embodiment is designed to survive any single node or link failure per network, except for a failure of the source or the destination, which cannot be survived in any case. For most failures, two sets of data continue to be sent from network 110 to network 130.

Figure 3:
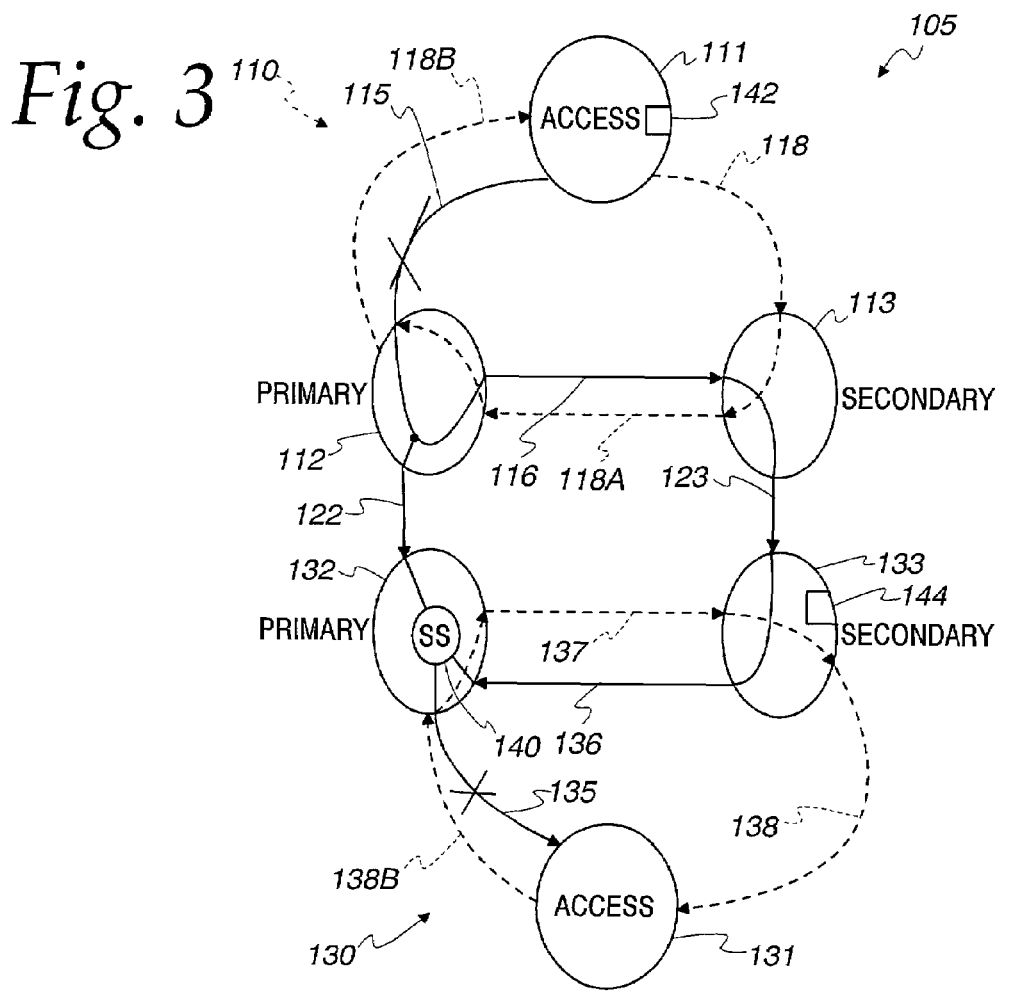
FIG. 3 is a schematic block diagram illustrating one mode of operation of the embodiment shown in FIG. 2 when a primary data route of the embodiment is interrupted.

One exemplary failure is shown in FIG. 3. More specifically, if there is a failure between source 111 and primary node 112 in network 110 (indicated by the X across route 115 in FIG. 3), primary node 112 uses a detector function to detect the failure and notify source node 111. Source node 111 uses a selector function 142 to switch its data traffic to an alternate (protection) path 118 to secondary node 113. The data is routed to primary node 112 over secondary routes 118 and 118A. Primary node 112 generates a second set of the data and sends the second set to secondary node 113 over route 116. The first set of data is sent ("dropped") by node 112 to primary node 132 over route 122, and the second set of the data is sent from secondary node 113 to secondary node 133 over route 123.

If primary node 112 fails, then secondary node 113 detects the failure and informs source 111. Source 111 sends its data along route 118 and secondary node 113 now stops receiving data from route 116 and switches over to receive data from route 118.

If secondary node 113 in network 110 fails, source node 111 and primary node 112 in network 110 continue to operate normally, and node 112 drops the first set of data across route 122 as before. If any node or link between the primary and secondary nodes in network 110 fails, then secondary node 113 detects the failure and notifies primary node 112, which switches its second set of data traffic from route 116 to secondary routes 118B and 118. Secondary node 113 switches over to receiving data from route 118 and sends this traffic to secondary node 133 over route 123 as before. If one of the links or routes between the two networks fails, the nodes in network 110 continue to act normally; however, if primary node 132 in network 130 was selecting the data set coming directly from network 110 and this data is lost, primary node 132 switches over to selecting the data set from secondary node 133. Similarly, if secondary node 133 in network 130 loses its data set from network 110, node 133 stops sending data traffic to primary node 132. If secondary node 133 in network 130 fails, then all the remaining nodes will continue to act as they would under normal operation, except that if primary node 132 in network 130 was selecting the data set coming from secondary node 133 in network 130, node 132 will switch over to the data set received directly from network 110. If any node or link between the primary and secondary nodes in network 130 fails, then primary node 132 detects the failure and notifies secondary node 133, which switches its data traffic from route 136 to secondary routes 138 and 138B. Primary node 132 switches over to receiving data from route 138B instead of route 136 and performs its service selection function on the data traffic on route 122 and the data traffic on route 138B.

If there is a failure between primary node 132 in network 130 and destination node 131 (as indicated by the X across route 135 in FIG. 3), then destination node 131 detects the failure and notifies primary node 132, which sends the first set of data along a secondary route 137 to secondary node 133 that sends a set of the data along a protection path 138 to destination node 131. As may be seen from FIG. 3, in all these cases, the data traffic continues to be transmitted from source node 111 to destination node 131.

Still referring to FIG. 3, if primary node 132 fails, then destination node 131 detects the failure and informs secondary node 133. Secondary node 133 and destination node 131 then re-establish communication along route 138.

Figure 4:
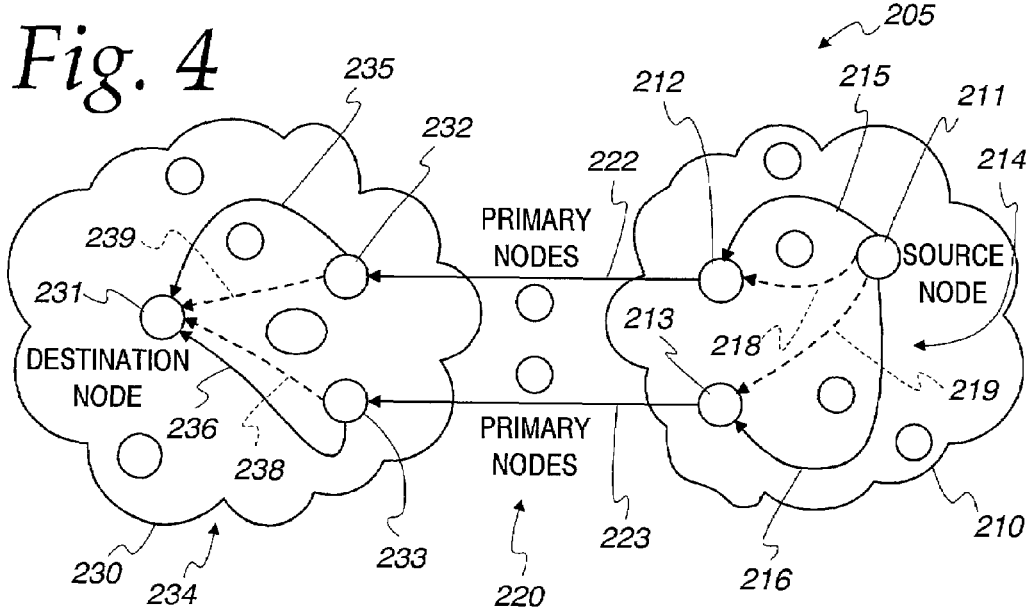
FIG. 4 is a schematic block diagram illustrating a preferred form of a dual transmit embodiment of the invention.

Referring to FIG. 4, another form of the invention using a dual transmit mode of operation is embodied in a communication system 205 including two telecommunications networks 210 and 230, each comprising a collection of geographically dispersed network elements, called nodes. Inter-network routes 220, including routes 222 and 223, connect networks 210 and 230.

Network 210 may include a source node 211, a primary node 212 and a secondary node 213, which are connected to one another by communication links or routes (e.g., fiber, wireless links or routes). For example, a set of primary routes 214, including primary routes 215-216, links source node 211, primary node 212 and secondary node 213 as shown. Secondary routes 218-219 link source node 211 with primary node 212 and secondary node 213 as shown.

Network 230 includes a destination node 231, a primary node 232 and a secondary node 233, which are connected to one another by communication links or routes (e.g., fiber, wireless links or routes). For example, a set of primary routes 234, including primary routes 235-236, links destination node 231, primary node 232 and secondary node 233 as shown.

The topology of each network 210 and 230 may be a ring or an arbitrary mesh. Traffic may be intra-network, i.e., staying entirely within network 210 or entirely within network 230, or it may be inter-network, i.e., originating in network 210 and terminating in network 230 (or vice versa).

The embodiment of FIG. 4 covers the case in which networks 210 and 230 are arbitrary mesh networks and the case in which one is a ring and the other is a mesh.

In the example of FIG. 4, it is assumed that source node 211 is the source of the inter-network data and that destination node 231 in network 230 is the destination for the data.

In each network, two nodes are selected to be dual-homing nodes. One dual-homing node is designated to be the primary node (i.e., nodes 212 and 232) and the other is designated to be the secondary node (i.e., nodes 213 and 233). In each node, a network element, such as a cross-connect, is configured to perform various functions that will be described.

Still referring to FIG. 4, under normal operation, source node 211 receives or generates a first set of data and generates a second set of the data. The first set of the data is sent to primary node 212 over route 215, and the second set of the data is sent to secondary node 213 over route 216. Primary node 212 transmits the first set of data to primary node 232 over route 222, and secondary node 213 sends the second set of data to secondary node 233 over route 223. Thus, the network use same-side routing. (There may exist intermediate nodes between source node 211 and primary node 212, and between primary node 212 and secondary node 213 (not shown).) The net effect is for network 210 to send two sets (1+1) of the inter-network data to network 230, one to each dual-homing node in network 230 (i.e., to nodes 232 and 233 as shown in FIG. 4).

During normal operation, secondary node 233 in network 230 sends the second set of the data to destination node 231 over route 236, and primary node 232 sends the first set of the data to destination node 231 over route 235. Destination node 231 then performs a service selection (SS) function: node 231 chooses one of the two incoming sets of data (i.e., the set of data from secondary node 233 in network 230 or the set of data from primary node 232.

The FIG. 4 embodiment is designed to survive any single node or link failure per network, except for a failure of the source or the destination, which cannot be survived in any case. For most failures, two sets of data continue to be sent from network 210 to network 230.

If there is a failure between source 211 and primary node 212 in network 210, primary node 212 uses a detector function to detect the failure and notify source node 211, which uses a selector function to switch the first set of data traffic to an alternate (protection) path 218. If there is a failure between source 211 and secondary node 213 in network 210, secondary node 213 uses a detector function to detect the failure and notify source node 211, which uses a selector function to switch the second set of data traffic to an alternate (protection) path 219. In either case, two sets of data continue to be received at nodes 212 and 213.

If secondary node 213 in network 210 fails, source node 211 and primary node 212 in network 210 continue to operate normally. If one of the links or routes between the two networks fails, the nodes in network 210 continue to act normally, and data is delivered to network 230 over the unaffected route. If secondary node 233 in network 230 fails, the first set of data is still delivered to destination node 231 over route 235. If primary node 232 fails, the second set of data is still delivered to destination node 231 over route 236. If there is a failure between primary node 232 in network 230 and destination node 231, then destination node 231 detects the failure and informs primary node 232. Primary node 232 and destination node 231 then re-establish communication along route 239. If there is a failure between secondary node 233 in network 230 and destination node 231, then destination node 231 detects the failure and informs secondary node 233. Secondary node 233 and destination node 231 then re-establish communication along route 238. As may be seen from FIG. 4, in all these cases, the data traffic continues to be transmitted from source node 211 to destination node 231.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its cope. Therefore, it is intended that the invention not be limited to the particular embodiment disclosed, but that the invention will include all embodiment falling within the scope of the appended claims.

What is claimed is:

1. In a communication system comprising a first network including a source arranged to transmit data and a second network including a destination arranged to receive the data, apparatus for communicating between the source and destination comprising:

a first network and a second network, wherein at least one of said first network and said second network is a mesh network;

a first primary node in the first network;

a first secondary node in the first network;

a second primary node in the second network;

a second secondary node in the second network;

a first set of primary routes within the first network arranged to deliver a first set of the data to the first primary node and a second set of the data to the first secondary node, wherein the second set of data comprises a copy of the first set of the data;

a plurality of inter-network routes between the first and second networks arranged to deliver the first and second sets of the data to the second primary node and the second secondary node;

a second set of primary routes within the second network arranged to deliver at least one of the first and second sets of data to the destination node;

a selector within the second network arranged to select one of the first and second sets of data;

a first secondary route within the first network between the source and the first secondary node;

a first route selector arranged to select the first secondary route in the event that a primary route within the first set of primary routes is disabled;

a second secondary route within the second network between the second secondary node and the destination; and a second route selector arranged to select the second secondary route in the event that a primary route within the second set of primary routes is disabled.

2. Apparatus, as claimed in claim 1, wherein the first network comprises a mesh network and the second network comprises a mesh network.

3. Apparatus, as claimed in claim 1, wherein the first network comprises a ring network and the second network comprises a mesh network.

4. Apparatus, as claimed in claim 1, wherein the first set of primary routes comprise a first primary route linking the source with the first primary node and a second primary route linking the first primary node with the first secondary node.

5. Apparatus, as claimed in claim 4, wherein the second set of primary routes comprise a third primary route linking the second primary node with the destination and a fourth primary route linking the second secondary node with the second primary node.

6. Apparatus, as claimed in claim 1, wherein the selector is located in the second primary node.

7. Apparatus, as claimed in claim 1, wherein the second set of the data normally is generated by the first primary node.

8. Apparatus, as claimed in claim 1, wherein the second set of data is absent in the event that any of the primary routes within the first set of primary routes is disabled.

9. Apparatus, as claimed in claim 1, wherein in the event that the primary route linking the source with the first primary node is disabled, the data is routed from the source to the first primary node through the first secondary route and the first secondary node, the second set of the data is generated by the first primary node, and the second set of the data is routed to the first secondary node.

10. Apparatus, as claimed in claim 1, wherein the first set of primary routes comprise a first primary route linking the source with the first primary node and a second primary route linking the source with the first secondary node.

11. Apparatus, as claimed in claim 10, wherein the second set of primary routes comprise a third primary route linking the destination with the second primary node and a fourth primary route linking the destination with the second secondary node.

12. Apparatus, as claimed in claim 11, and further comprising:
a third secondary route within the first network between the source and first primary node; and
a fourth secondary route within the second network between the destination and the second primary node.

13. Apparatus, as claimed in claim 1, wherein the selector is located in the destination.

14. Apparatus, as claimed in claim 1, wherein the second set of the data is generated by the source.

15. In a communication system comprising a first network including a source arranged to transmit data and a second network including a destination arranged to receive the data, at least one of the first network and the second network being a mesh network, the system also comprising a first primary node in the first network, a first secondary node in the first network, a second primary node in the second network, a second secondary node in the second network, a first set of primary routes within the first network, a second set of primary routes within the second network, a first secondary route within the first network between the source and the first secondary node, and a second secondary route within the second network between the second secondary node and the destination, a method of reducing interruptions in communication between the source and destination comprising:
generating a first set of the data;
generating a second set of the data;
delivering the first set of the data to the first primary node;
delivering the second set of the data to the first secondary node;
delivering the first and second sets of the data to the second primary node and the second secondary node;
delivering at least one of the first and second sets of data to the destination node;
selecting one of the first and second sets of data;
delivering the first set of data to the first secondary node over the first secondary route in the event that a primary route within the first set of primary routes is disabled; and
delivering the at least one of the first and second sets of data to the destination over the second secondary route in the event that a primary route within the second set of primary routes is disabled.

16. A method, as claimed in claim 15, wherein the first network comprises a mesh network and the second network comprises a mesh network.

17. A method, as claimed in claim 15, wherein the first network comprises a ring network and the second network comprises a mesh network.

18. A method, as claimed in claim 15, wherein the first set of primary routes comprise a first primary route linking the source with the first primary node and a second primary route linking the first primary node with the first secondary node.

19. A method, as claimed in claim 18, wherein the second set of primary routes comprise a third primary route linking the second primary node with the destination and a fourth primary route linking the second secondary node with the second primary node.

20. A method, as claimed in claim 15, wherein said selecting one of the first and second sets of data occurs in the second primary node.

21. A method, as claimed in claim 15, wherein said generating a second set of data occurs at the first primary node.

22. A method, as claimed in claim 15, wherein the second set of data is absent in the event that any of the primary routes within the first set of primary routes is disabled.

23. A method, as claimed in claim 15, wherein in the event that a primary route linking the source with the first primary node is disabled, said delivering the first set of data to the first primary node comprises routing the first set of data from the source to the first primary node through the first secondary route and the first secondary node, wherein said generating a second set of data occurs at the first primary node, and wherein said delivering the second set of data to the first secondary node comprises routing the second set of data from the first primary node to the first secondary node.

24. A method, as claimed in claim 15, wherein the first set of primary routes comprise a first primary route linking the source with the first primary node and a second primary route linking the source with the first secondary node.

25. A method, as claimed in claim 24, wherein the second set of primary routes comprise a third primary route linking the destination with the second primary node and a fourth primary route linking the destination with the second secondary node.

26. A method, as claimed in claim 25, and further comprising:
a third secondary route within the first network between the source and first primary node; and
a fourth secondary route within the second network between the destination and the second primary node.

27. A method, as claimed in claim 15, wherein said selecting one of the first and second sets of data occurs in the destination.

28. A method, as claimed in claim 15, wherein said generating a first set of data and generating a second set of data occurs at the source.

29. An apparatus for use in a communication system, said apparatus comprising:

a source network containing a source node;
a destination network containing a destination node,
wherein at least one of said source network and said destination network is a mesh network,
wherein said destination network is a network other than said source network;
a first route from said source network to said destination network, wherein said first route employs a first connection between said source network and said destination network;
a second route from said source network to said destination network, wherein said second route employs a second connection between said source network and said destination network, wherein said second route is not identical to said first route;
a first data set originating from said source node and passing through said first connection;
a second data set comprising a copy of said first data set and passing through said second connection;
a source network primary node and a source network secondary node within said source network;
a set of source routes including a source primary route capable of sending said first data set from said source node to said source network primary node, a source secondary route capable of sending said data set from said source node to said source network secondary node, and a source redundancy route capable of sending said first data set and said second data set between said source network primary node and said source network secondary node;
a destination network primary node and a destination network secondary node within said destination network; and
a set of destination routes including a destination primary route capable of sending said first data set from said destination network primary node to said destination node, a destination secondary route capable of sending said second data set from said destination network secondary node to said destination node, and a destination redundancy route capable of sending said first data set and said second data set between said destination network primary node and said destination network secondary node.

30. The apparatus of claim 29, wherein said first route employs said first connection between said source network primary node and said destination network primary node and said second route employs said second connection between said source network secondary node and said destination network secondary node.

31. The apparatus of claim 29, wherein said second set of data is created by said source node.

32. The apparatus of claim 29, wherein said second set of data is created by said source network primary node.

33. The apparatus of claim 29, wherein said second set of data is created by said source network secondary node.

34. The apparatus of claim 29, wherein said second set of data is created by said destination network primary node.

35. The apparatus of claim 29, wherein said second set of data is created by said destination network primary node.

36. The apparatus of claim 29, wherein said set of source routes further includes:
a source primary redundant route capable of sending said first data set from said source node to said source network primary node and a source secondary redundant route capable of sending said second data set from said source node to said source network secondary node.

37. The apparatus of claim 29, wherein said set of destination routes further includes:
a destination primary redundant route capable of sending said first data set from said destination network primary node to said destination node and a destination secondary redundant route capable of sending said second data set from said destination network secondary node to said destination node.

38. A meted for inter-working communication networks, said method comprising:
establishing communication with a source network containing a source node;
establishing communication with a destination network containing a destination node,
wherein at least one of said source network and said destination network is a mesh network,
wherein said destination network is a network other than said source network;
defining a first route between said source network and said destination network, wherein said first route employs a first connection between said source network and said destination network;
defining a second route between said source network and said destination network, wherein said second route employs a second connection between said source network and said destination network, wherein said second route is not identical to said first route;
receiving a first data set from said source node through said first connection;
creating a second data set comprising a copy of said first data set and transmitting said second set of data through said second connection; and
creating an additional copy of said first data set after the loss of said second data set and transmitting said additional copy of said first data set along a path distinct from the path of said first data set.

39. The method of claim 38, further including:
establishing a source network primary node and a source network secondary node within said source network;
defining a set of source routes including a source primary route capable of sending said first data set from said source node to said source network primary node, a source secondary route capable of sending said data set from said source node to said source network secondary node, and a source redundancy route capable of sending said first data set and said second data set between said source network primary node and said source network secondary node;
establishing a destination network primary node and a destination network secondary node within said destination network; and
defining a set of destination routes including a destination primary route capable of sending said first data set from said destination network primary node to said destination node, a destination secondary route capable of sending said second data set from said destination network secondary node to said destination node, and a destination redundancy route capable of sending said first data set and said second data set between said destination network primary node and said destination network secondary node.

40. The method of claim 39, further including:
linking said source network primary node to said destination network primary node; and
linking said source network secondary node to said destination network secondary node.

41. The method of claim 39, further including:
linking said source network primary node to said destination network secondary node; and
linking said source network secondary node to said destination network primary node.

42. The method of claim 38, further including:
selecting one of said first set of data and said second set of data to forward to said destination node.

43. The method of claim 39, further including:
creating a copy of said first set of data after a network failure and sending said copy of said first set of data through said second route.

44. The method of claim 39, further including:
creating a copy of said second set of data after a network failure and sending said copy of said second set of data said first route.

45. The method of claim 38, wherein said creating of said second data set occurs before said transmitting of said first data set.

46. The method of claim 38, further including:
creating an additional copy of said second data set after the loss of said first data set and transmitting said additional copy of said second data set along a path distinct from the path of said second data set.

47. A communication system comprising:
a source network containing a source node;
a destination network containing a destination node,
wherein one of said source network and said destination network is a mesh network and one of said source network and said destination network is a ring-based network,
wherein said destination network is a network other than said source network;
a first connection between said source network and said destination network;
a second connection between said source network and said destination network, wherein said second connection is not identical to said first connection;
a first data set originating from said source node and passing through said first connection; and
a second data set comprising a copy of said first data set, said second data set passing through said second connection.

48. The apparatus of claim 29, wherein said first route employs said first connection between said source network primary node and said destination network secondary node and said second route employs said second connection between said source network secondary node and said destination network primary node.

49. The apparatus of claim 29, further including:
a selector within said destination network capable of choosing one of said first set of data and said second set of data to forward to said destination node.

* * * * *